(12) United States Patent
Patel et al.

(10) Patent No.: US 7,626,963 B2
(45) Date of Patent: Dec. 1, 2009

(54) EAP/SIM AUTHENTICATION FOR MOBILE IP TO LEVERAGE GSM/SIM AUTHENTICATION INFRASTRUCTURE

(75) Inventors: Alpesh S. Patel, Pleasanton, CA (US); Kent K. Leung, Los Altos, CA (US); Joseph A. Salowey, Seattle, WA (US); Yu-Cheng Shao, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 303 days.

(21) Appl. No.: 11/258,720

(22) Filed: Oct. 25, 2005

(65) Prior Publication Data
US 2007/0091843 A1 Apr. 26, 2007

(51) Int. Cl.
*H04W 4/00* (2009.01)
(52) U.S. Cl. .................. 370/331; 370/338; 370/351; 455/419; 455/432.1; 455/432.3; 455/433; 455/435.1; 455/435.2; 455/436; 455/41.2; 455/41.3
(58) Field of Classification Search .......... 370/331, 370/338, 351; 455/41.2, 41.3, 419, 432.1, 455/432.3, 433, 435.1, 435.2, 436
See application file for complete search history.

(56) References Cited

U.S. PATENT DOCUMENTS

| | | |
|---|---|---|
| 4,692,918 A | 9/1987 | Elliott et al. |
| 5,016,244 A | 5/1991 | Massey et al. |
| 5,018,133 A | 5/1991 | Tsukakoshi et al. |
| 5,218,600 A | 6/1993 | Schenkyr et al. |
| 5,371,852 A | 12/1994 | Attanasio et al. |
| 5,473,599 A | 12/1995 | Li et al. |
| 5,793,762 A | 8/1998 | Penners et al. |
| 6,119,160 A | 9/2000 | Zhang et al. |
| 6,148,074 A | 11/2000 | Milavsky et al. |
| 6,148,405 A | 11/2000 | Liao et al. |
| 6,230,012 B1 | 5/2001 | Willkie et al. |
| 6,339,830 B1 | 1/2002 | See et al. |
| 6,377,982 B1 | 4/2002 | Rai et al. |

(Continued)

FOREIGN PATENT DOCUMENTS

| | | |
|---|---|---|
| CH | 694678 | 5/2005 |

(Continued)

OTHER PUBLICATIONS

European Office Action, dated Sep. 6, 2006, from corresponding European Patent Application No. 03 789 813.7, 5 pages.

(Continued)

*Primary Examiner*—Stephen M D'Agosta
(74) *Attorney, Agent, or Firm*—Weaver Austin Villeneuve & Sampson LLP (57) ABSTRACT

Methods and apparatus for dynamically generating a set of Mobile IP keys are disclosed. The set of Mobile IP keys is dynamically generated using an existing HLR/AuC authentication infrastructure. This is accomplished, in part, by obtaining an International Mobile Subscriber Identity (IMSI) that uniquely identifies a particular Mobile Node. Once a set of Mobile IP keys is generated from authentication information associated with the IMSI, the Mobile Node may register with its Home Agent using the set of Mobile IP keys.

17 Claims, 5 Drawing Sheets

U.S. PATENT DOCUMENTS

| | | | |
|---|---|---|---|
| 6,487,605 B1 | 11/2002 | Leung | |
| 6,535,493 B1 | 3/2003 | Lee et al. | |
| 6,560,217 B1 | 5/2003 | Peirce, Jr. et al. | |
| 6,728,536 B1* | 4/2004 | Basilier et al. | 455/432.1 |
| 6,760,444 B1 | 7/2004 | Leung | |
| 6,785,823 B1 | 8/2004 | Abrol et al. | |
| 6,795,857 B1 | 9/2004 | Leung et al. | |
| 6,879,690 B2 | 4/2005 | Faccin et al. | |
| 6,907,016 B2 | 6/2005 | Madour et al. | |
| 6,947,725 B2 | 9/2005 | Aura | |
| 6,956,846 B2* | 10/2005 | Lewis et al. | 370/352 |
| 6,980,802 B2 | 12/2005 | Jung | |
| 7,003,282 B1 | 2/2006 | Ekberg | |
| 7,039,404 B2 | 5/2006 | Das et al. | |
| 7,042,879 B2 | 5/2006 | Eschbach et al. | |
| 7,061,887 B2 | 6/2006 | Fan | |
| 7,065,067 B2* | 6/2006 | Song et al. | 370/338 |
| 7,073,066 B1 | 7/2006 | Nessett | |
| 7,107,051 B1 | 9/2006 | Walker | |
| 7,107,620 B2 | 9/2006 | Haverinen et al. | |
| 7,158,777 B2 | 1/2007 | Lee et al. | |
| 7,168,090 B2 | 1/2007 | Leung | |
| 7,174,018 B1 | 2/2007 | Patil et al. | |
| 7,181,196 B2* | 2/2007 | Patel | 455/411 |
| 7,218,609 B2* | 5/2007 | Borella et al. | 370/230 |
| 7,224,673 B1 | 5/2007 | Leung et al. | |
| 7,286,520 B2 | 10/2007 | Takeda et al. | |
| 7,298,847 B2* | 11/2007 | Jing et al. | 380/247 |
| 7,320,070 B2 | 1/2008 | Baum | |
| 7,409,549 B1* | 8/2008 | Leung et al. | 713/168 |
| 7,475,241 B2* | 1/2009 | Patel et al. | 713/155 |
| 7,502,331 B2 | 3/2009 | Dommety et al. | |
| 2002/0120844 A1* | 8/2002 | Faccin et al. | 713/168 |
| 2002/0147820 A1 | 10/2002 | Yokote | |
| 2003/0005280 A1 | 1/2003 | Bobde et al. | |
| 2003/0028763 A1* | 2/2003 | Malinen et al. | 713/155 |
| 2003/0069990 A1 | 4/2003 | D'Annunzio et al. | |
| 2003/0115468 A1 | 6/2003 | Aull et al. | |
| 2004/0103282 A1 | 5/2004 | Meier et al. | |
| 2004/0114558 A1 | 6/2004 | Krishnamurthi et al. | |
| 2004/0162105 A1* | 8/2004 | Reddy et al. | 455/551 |
| 2004/0234075 A1 | 11/2004 | Leung | |
| 2005/0010780 A1 | 1/2005 | Kane et al. | |
| 2005/0025091 A1 | 2/2005 | Patel et al. | |
| 2005/0083905 A1 | 4/2005 | Nishida et al. | |
| 2005/0102522 A1 | 5/2005 | Kanda | |
| 2005/0135622 A1* | 6/2005 | Fors et al. | 380/268 |
| 2005/0135624 A1* | 6/2005 | Tsai et al. | 380/270 |
| 2005/0138355 A1* | 6/2005 | Chen et al. | 713/155 |
| 2005/0177515 A1* | 8/2005 | Kalavade et al. | 705/52 |
| 2005/0177723 A1* | 8/2005 | Huang et al. | 713/168 |
| 2006/0046693 A1* | 3/2006 | Tran et al. | 455/411 |
| 2006/0072759 A1 | 4/2006 | Gundavelli et al. | |
| 2006/0104247 A1 | 5/2006 | Dommety et al. | |
| 2007/0124592 A1 | 5/2007 | Oyama | |
| 2007/0230453 A1 | 10/2007 | Giaretta et al. | |
| 2007/0274266 A1 | 11/2007 | Oyama | |

FOREIGN PATENT DOCUMENTS

| | | | |
|---|---|---|---|
| EP | 1139634 | * | 10/2001 |
| WO | WO 01/76134 | | 10/2001 |
| WO | WO 02/069605 | | 9/2002 |

OTHER PUBLICATIONS

International Search Report dated Jun. 18, 2004 from related International Application No. PCT/US 03/36850.

U.S. Office Action mailed Jul. 3, 2007 from U.S. Appl. No. 10/328,522.

U.S. Office Action mailed Jan. 11, 2007, from U.S. Appl. No. 10/328,522.

U.S. Office Action mailed Jul. 26, 2006 from related U.S. Appl. No. 10/328,522.

U.S. Office Action mailed Mar. 13, 2007 from U.S. Appl. No. 10/635,882.

Haverinen et al., "Extensible Authentication Protocol Method for GSM Subscriber Identity Modules (EAP-SIM)," Internet Draft, Dec. 21, 2004, 85 pages.

"Mobile IP," Release 12.0(1)T, pp. 1-55.

C. Finseth, RFC 1492, "An Access Control Protocol, Sometimes Called TACACS," Jul. 1993.

C. Perkins, "IP Mobility Support," RFC 2002, IBM Corporation, Oct. 1996.

C. Perkins, Ed. RFC 3344, "IP Mobility Support for IPv4," Aug. 2002.

C. Perkins, Ed., RFC 3220, "IP Mobility Support for IPv4" Jan. 2002.

C. Perkins, et al., Internet Draft, "AAA Registration Keys for Mobile IP," http://www.ietf.org/proceedings/00jul/I-D/mobileip-aaa-key-01.txt, Jan. 28, 2000.

C. Perkins, et al., Internet Draft, "AAA Registration Keys for Mobile IP," draft-ietf-mobileip-aaa-key-10.txt, Oct. 23, 2002.

C. Perkins, et al., Internet Draft, "AAA Registration Keys for Mobile IP," draft-ietf-mobileip-aaa-key-13.txt, Jun. 22, 2003.

C. Perkins, et al., RFC 3012, "Mobile IPv4 Challenge/Response Extensions," Nov. 2000.

C. Perkins, *Mobile IP and Security Issue: An Overview*, Nokia, U.S., Oct. 25, 1999, pp. 131-148, XP010514313.

C. Rigney, et al., RFC 2138, "Remote Authentication Dial in User Service (RADIUS)," Apr. 1997.

C. Rigney, RFC 2139 "RADIUS Accounting,", Livingston, Apr. 1997.

Chambless, et al., "Home Agent Redundancy Protocol (HARP)," Oct. 27, 1997.

D. Carrel and Lol Grant, Internet Draft, "The TACACS+ Protocol," Jan. 1997.

D. Cong and M. Hamlen, and C. Perkins, RFC 2006, "The Definitions of Managed Objects for IP Mobility Support using SMIv2," Motorola and IBM, Oct. 1996.

D. Harkins and D. Carrel, "The Internet Key Exchange (IKE)," Cisco Systems, Jun. 1998.

D. Oran, RFC 1142 "OSI IS-IS Intra-domain Routing Protocol," Feb. 1990.

G. Dommety, et al. RFC 3115, "Mobile IP Vendor/Organization-Specific Extensions," Apr. 2001.

G. Zorn, RFC 2548, "Microsoft Vendor-specific RADIUS Attributes," Mar. 1999.

G. Zorn, RFC 2759, "Microsoft PPP CHAP Extensions, Version 2," Jan. 2000.

J. Kohl, et al., RFC 1510, "The Kerberos Network Authentication Service (V5)" Sep. 1993.

J. Moy, RFC 1247 "OSPF Version 2," Jul. 19, 1991.

K. Sufatrio, et al., *Mobile IP Registration Protocol: A Security Attack and New Secure Minimal Public-Key Based Authentication*, Parallel Architectures, Algorithms, and Networks, 1999 (I-Span '99) proceedings. Fourth International Symposium, Perth/Fremantle, Australia, Jun. 23-25, 1999, Los Alamitos, California, IEEE pp. 364-369, XP010341845.

Montenegro, G., RFC 2344, "Reverse Tunneling for Mobile IP," Sun Microsystems, Inc., May 1998.

Release notes for 3Com Corporation, "Conducting a Redundant Route for Network Resiliency," Mar. 1994, *NET Builder Family Bridge/Router* pp. 26-29.

S. Jacobs, et al., Internet Draft, "Mobile IP Public Key Based Authentication," draft-jacobs-mobileip-pki-auth-03.txt, Jul. 9, 2001.

S. Jacobs, *Mobile IP Public Key Based Authentication*, Internet draft, Aug. 1, 1998, pp. 1-27, XP002285008.

S. Jacobs, *Security of Current Mobile IP Solutions*, MILCOM 97 Proceedings, Monterey, California, Nov. 2-5, 1997, IEEE pp. 1122-1128, XP010260752.

T. Li, et al., RFC 2281 "Cisco Hot Standby Router Protocol (HSRP)," Mar. 1998.

Uyless Black, "TCP/IP and Related Protocols," 1992, McGraw-Hill, Inc., pp. 226-249.

K. Leung, et al., U.S. Appl. No. 10/328,522, "Methods and Apparatus for Authenticating Mobility Entities Using Kerberos," filed Dec. 24, 2002.
Rigney et al., "Remote Authentication Dial In User Service (RADIUS)", RFC 2865, Jun. 2000 (76 pgs.).
Aboda et al., "The Network Access Identifier", RFC 2486, Jan. 1999 (8 pgs.).
Calhoun et al., "Mobile IP Network Access Identifier Extension for IPv4", RFC 2794, Mar. 2000 (9 pgs.).
D. Eastlake "DNS Security Operational Considerations", RFC 2541, Mar. 1999 (7 pgs.).
D. Johnson "Mobility Support in IPv6," RFC 3775, Jun. 2004 (165 pgs.).
U.S. Office Action dated Aug. 20, 2007 from related U.S. Appl. No. 10/635,882, 15 pgs.
International Search Report and Written Opinion dated May 21, 2007, from corresponding International Application No. PCT/US06/41511.
Calhoun et al., "Diameter Base Protocol," RFC 3588, Sep. 2003 (133 pgs.).
C. Perkins et al., "Authentication, Authorization, and Accounting (AAA) Registration Keys for Mobile IPv4," RFC 3957, Mar. 2005, (27 pgs.).
A. Patel, et al., U.S. Appl. No. 10/635,882 Methods and Apparatus for Dynamic Session Key Generation and Rekeying in Mobile IP, Filed Aug. 5, 2003.
S. Gundavelli, et al., U.S. Appl. No. 10/951, 499, "Methods and Apparatus for Bootstrapping Mobile-Foreign and Foreign-Home Authentication Keys in Mobile IP", filed Sep. 27, 2004.
G. Dommety et al., U.S. Appl. No. 10/992,435, "Infrastructure-less Bootstrapping: Trustless Bootstrapping to Enable Mobility for Mobile Devices," filed Nov. 17, 2004.

K. Leung et al. U.S. Appl. No. 10/866,654, "Mobile IP Authentication" filed Jun. 10, 2004.
U.S. Office Action dated Dec. 21, 2007 from related U.S. Appl. No. 10/328,522, 15 pages.
U.S. Office Action dated Feb. 5, 2008 from related U.S. Appl. No. 10/635,882, 15 pgs.
U.S. Office Action dated Mar. 17, 2008 from related U.S. Appl. No. 10/992,435, 15 pages.
Notice of Allowance and Allowed Claims dated Aug. 29, 2008 from related U.S. Appl. No. 10/635,882, 17 pages.
U.S. Office Action dated Oct. 14, 2008 from U.S. Appl. No. 10/951,499.
U.S. Office Action dated Oct. 16, 2008 from U.S. Appl. No. 10/328,522.
Notice of Allowance and Allowed Claims dated Oct. 23, 2008 from U.S. Appl. No. 10/992,435.
Australian Office Action dated May 2, 2008 from AU Application No. 2003294330, 1 page.
Office Action dated Jan. 6, 2009 issued for CA Patent Application No. 2,506,670, 6 pgs.
Supplementary EP Search Report dated Jan. 9, 2009 from EP Application No. 06817346.7, 8 pages.
Office Action for CN Patent Application 200380103939.0 dated Feb. 20, 2009, 17 pgs.
Haverinen et al., "Authentication and Key Generation for Mobile IP using GSM Authentication and Roaming", ICC 2001. 2001 IEEE International Conference on Communications, New York, NY: IEEE; US, vol. 8, Jun. 11, 2001, pp. 2453-2457 (6 pgs.), XP010553567.
Haverinen et al., GSM SIM Authentication and Key Generation for Mobile IP draft-haverinen-mobileip-gsmsim-02.txt, Mobile IP Working Group, Nokia, Internet Draft, Apr. 2001, 20 pgs.

* cited by examiner

FIG. 5

EAP/SIM AUTHENTICATION FOR MOBILE IP TO LEVERAGE GSM/SIM AUTHENTICATION INFRASTRUCTURE

BACKGROUND OF THE INVENTION

The present invention relates to Mobile IP network technology. More particularly, the present invention relates to dynamically generating a set of Mobile IP keys from an existing authentication infrastructure.

Mobile IP is a protocol which allows laptop computers or other mobile computer units (referred to as "Mobile Nodes" herein) to roam between various sub-networks at various locations—while maintaining internet and/or WAN connectivity. Without Mobile IP or a related protocol, a Mobile Node would be unable to stay connected while roaming through various sub-networks. This is because the IP address required for any node to communicate over the internet is location specific. Each IP address has a field that specifies the particular sub-network on which the node resides. If a user desires to take a computer which is normally attached to one node and roam with it so that it passes through different sub-networks, it cannot use its home base IP address. As a result, a business person traveling across the country cannot merely roam with his or her computer across geographically disparate network segments or wireless nodes while remaining connected over the internet. This is not an acceptable state-of-affairs in the age of portable computational devices.

To address this problem, the Mobile IP protocol has been developed and implemented. An implementation of Mobile IP is described in RFC 3344 of the Network Working Group, C. Perkins, Ed., "IP Mobility Support for IPv4," August 2002. Mobile IP is also described in the text "Mobile IP Unplugged" by J. Solomon, Prentice Hall. Both of these references are incorporated herein by reference in their entireties and for all purposes.

Figure 1:
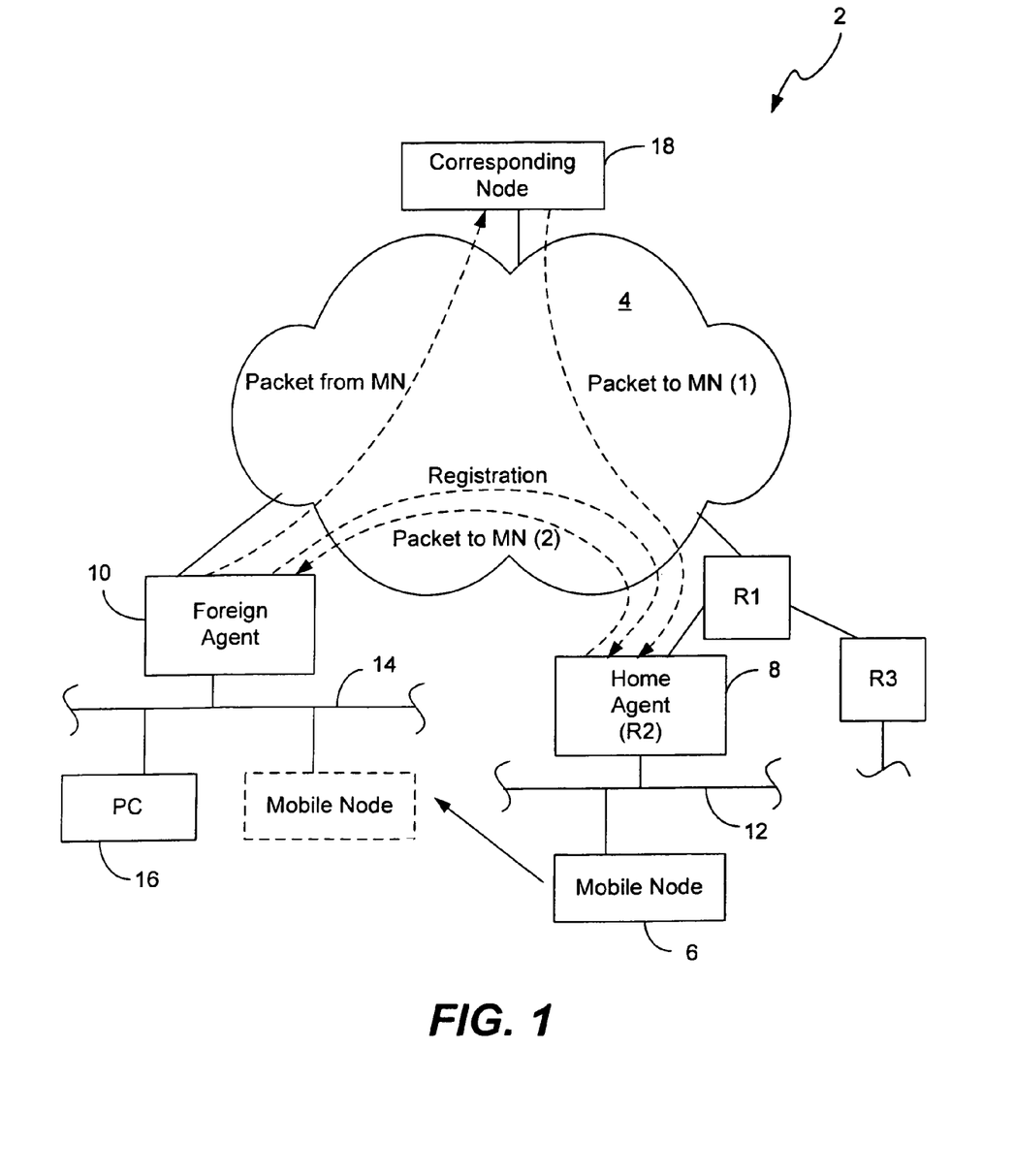
FIG. 1 is a diagram of a Mobile IP network segment and associated environment.

The Mobile IP process in a Mobile IPv4 environment are illustrated in FIG. 1. As shown there, a Mobile IP environment 2 includes the internet (or a WAN) 4 over which a Mobile Node 6 can communicate remotely via mediation by a Home Agent 8 and may also include a Foreign Agent 10. In the absence of a Foreign Agent in a Mobile IPv4 environment, or in a Mobile IPv6 environment in which a Foreign Agent is not implemented, the Mobile Node 6 can obtain a topologically correct IP address (i.e., collocated IP address) and register this IP address with the Home Agent. (In a Mobile IPv6 environment, this is accomplished via an Access Router rather than a Foreign Agent.) Typically, the Home Agent and Foreign Agent are routers or other network connection devices performing appropriate Mobile IP functions as implemented by software, hardware, and/or firmware. A particular Mobile Node (e.g., a laptop computer) plugged into its home network segment connects with the internet through its designated Home Agent. When the Mobile Node roams, it communicates via the internet through an available Foreign Agent. Presumably, there are many Foreign Agents available at geographically disparate locations to allow wide spread internet connection via the Mobile IP protocol. Note that it is also possible for the Mobile Node to register directly with its Home Agent.

As shown in FIG. 1, Mobile Node 6 normally resides on (or is "based at") a network segment 12 which allows its network entities to communicate over the internet 4 through Home Agent 8 (an appropriately configured router denoted R2). Note that Home Agent 8 need not directly connect to the internet. For example, as shown in FIG. 1, it may be connected through another router (a router R1 in this case). Router R1 may, in turn, connect one or more other routers (e.g., a router R3) with the internet.

Now, suppose that Mobile Node 6 is removed from its home base network segment 12 and roams to a remote network segment 14. Network segment 14 may include various other nodes such as a PC 16. The nodes on network segment 14 communicate with the internet through a router which doubles as Foreign Agent 10. Mobile Node 6 may identify Foreign Agent 10 through various solicitations and advertisements which form part of the Mobile IP protocol. When Mobile Node 6 engages with network segment 14, Foreign Agent 10 relays a registration request to Home Agent 8 (as indicated by the dotted line "Registration"). The Home and Foreign Agents may then negotiate the conditions of the Mobile Node's attachment to Foreign Agent 10. For example, the attachment may be limited to a period of time, such as two hours. When the negotiation is successfully completed, Home Agent 8 updates an internal "mobility binding table" which specifies the care-of address (e.g., a collocated care-of address or the Foreign Agent's IP address) in association with the identity of Mobile Node 6. Further, the Foreign Agent 10 updates an internal "visitor table" which specifies the Mobile Node address, Home Agent address, etc. In effect, the Mobile Node's home base IP address (associated with segment 12) has been shifted to the Foreign Agent's IP address (associated with segment 14).

Now, suppose that Mobile Node 6 wishes to send a message to a Correspondent Node 18 from its new location. In Mobile IPv4, a message from the Mobile Node is then packetized and forwarded through Foreign Agent 10 over the internet 4 and to Correspondent Node 18 (as indicated by the dotted line "packet from MN") according to a standard internet protocol. If Correspondent Node 18 wishes to send a message to Mobile Node—whether in reply to a message from the Mobile Node or for any other reason—it addresses that message to the IP address of Mobile Node 6 on sub-network 12. The packets of that message are then forwarded over the internet 4 and to router R1 and ultimately to Home Agent 8 as indicated by the dotted line ("packet to MN(1)"). From its mobility binding table, Home Agent 8 recognizes that Mobile Node 6 is no longer attached to network segment 12. It then encapsulates the packets from Correspondent Node 18 (which are addressed to Mobile Node 6 on network segment 12) according to a Mobile IP protocol and forwards these encapsulated packets to a "care of" address for Mobile Node 6 as shown by the dotted line ("packet to MN(2)"). The care-of address may be, for example, the IP address of Foreign Agent 10. Foreign Agent 10 then strips the encapsulation and forwards the message to Mobile Node 6 on sub-network 14. The packet forwarding mechanism implemented by the Home and Foreign Agents is often referred to as "tunneling." In the absence of a Foreign Agent, packets are tunneled directly to the Mobile Node 6 collocated care-of address.

Figure 2:
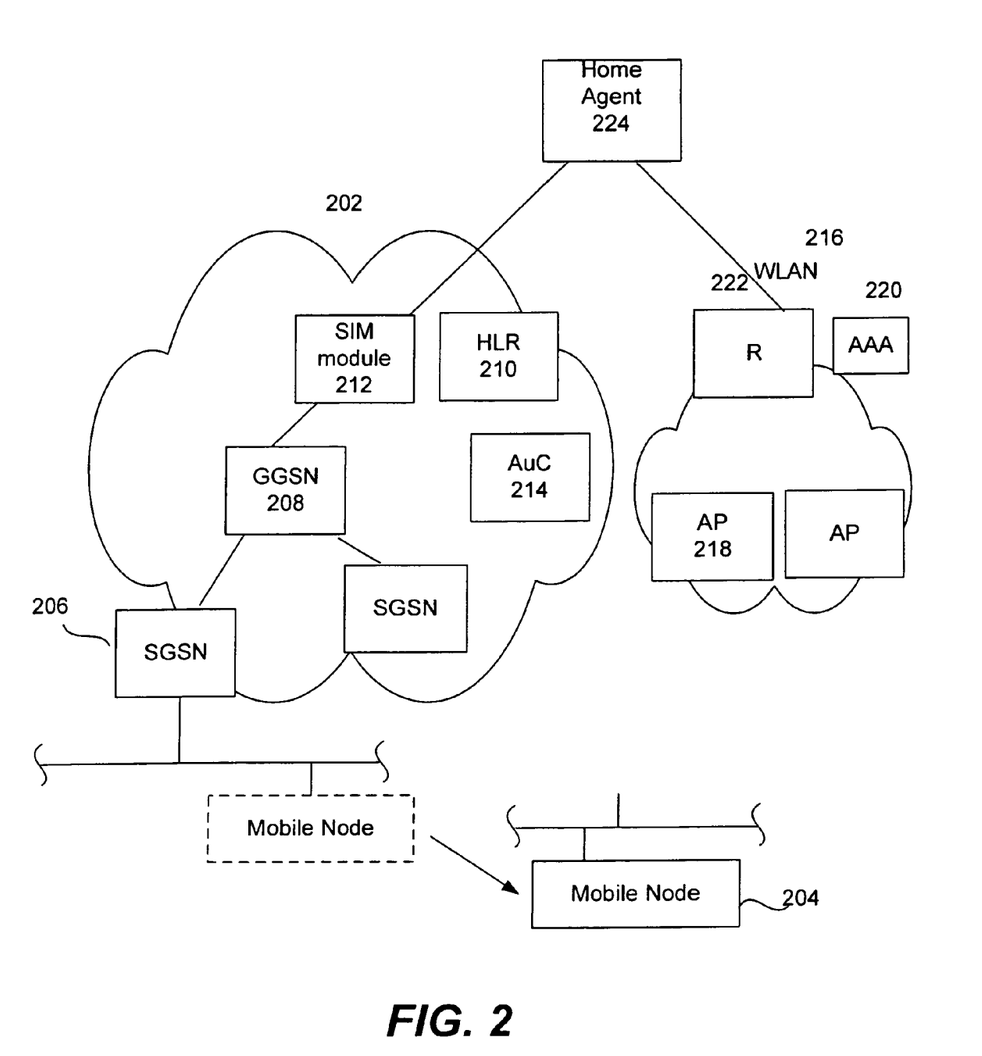
FIG. 2 is a diagram illustrating an exemplary GSM network in which the present invention may be implemented.

In a typical Global System for Mobile Communications (GSM) network 202 implementing General Packet Radio Service (GPRS), a Mobile Node 204 roams to a Serving GPRS Service Node (SGSN) 206. A GPRS Gateway Serving Node (GGSN) 208 provides mobility for the Mobile Node 204 by tunneling packets via the GPRS tunneling protocol to the SGSN 206. The Mobile Node 204 is authenticated by a Home Location Register (HLR) 210. Specifically, the HLR 210 uses a Subscriber Identifier Module (SIM) 212 to authenticate the user using a key associated with the SIM 212 This key is obtained from a database maintained by an Authentication Controller (AuC) 214.

When the Mobile Node 204 moves to a Wireless LAN (WLAN) 216 from the GPRS network 202, the Extensible Authentication Protocol (EAP)-SIM protocol allows the SIM to be carried by an EAP payload to an Access Point (AP) 218. The AP 218 converts the message including the SIM into a AAA protocol such as a RADIUS message, which is provided to a AAA server 220. The AAA server 220 or other network device 222 receiving the message converts the message into a Mobile Application Part (MAP) protocol, enabling the HLR 210 to authenticate the user using the SIM.

Various protocols such as the Remote Authentication Dial In User Service (RADIUS) and TACACS+ may be implemented to provide a AAA server. RFC 2865 describes the RADIUS Protocol and is hereby incorporated by reference. Similarly, RFC 1492 describes TACACS and the Internet-Draft "The TACACS+ Protocol Version 1.78," available at http://www.ietf.org/internet-drafts/draft-grant-tacacs-02.txt, describes TACACS+. Both of these documents are incorporated herein by reference for all purposes.

Unfortunately, when the Mobile Node 204 roams between the GSM network 202 and the WLAN network 216, it must obtain a new IP address. As a result, the Mobile Node 204 is unable to maintain a Mobile IP session as the Mobile Node 204 roams between the WLAN 216 and the GPRS network 202.

In order to enable the Mobile Node 204 to maintain its Mobile IP session while roaming, a Home Agent 224 is typically used. As a result, two different independent key management methods are generally implemented. The first key management method is the authentication of a user using the SIM, as set forth above. The second key management method includes Mobile IP keys enabling the Mobile Node 204 to register with the Home Agent 224. Thus, both sets of keys must be separately managed and statically configured on each of the pertinent entities.

In view of the above, it would be beneficial if the Mobile Node could maintain a Mobile IP session while roaming between a GPRS network and another network without requiring static configuration and management of two different sets of keys.

SUMMARY OF THE INVENTION

Methods and apparatus for generating a set of one or more Mobile IP keys are disclosed. Specifically, the set of Mobile IP keys is dynamically generated from an existing infrastructure such as a Home Location Register (HLR)/Authentication Controller (AuC) authentication infrastructure. In this manner, a set of Mobile IP keys may be dynamically generated.

In accordance with one aspect of the invention, a method of generating a set of Mobile IP keys includes obtaining an International Mobile Subscriber Identity (IMSI), enabling authentication information associated with the IMSI to also be obtained. For instance, the authentication information may be represented by a secret key (Ki) associated with the IMSI. At least one Mobile IP key is generated from the authentication information associated with the IMSI. For instance, SIM authentication triplets derived from the secret key (Ki) associated with the IMSI may be obtained from a Home Location Register, thereby enabling the Mobile IP key to be generated from this authentication information. A Mobile Node supporting Mobile IP may then register with a Home Agent supporting Mobile IP using the Mobile IP key.

In accordance with one embodiment of the invention, the Mobile Node may generate at least one Mobile IP key from the SIM authentication triplets returned for the IMSI, thereby enabling at least one Mobile IP key to be generated from the authentication information (e.g., Ki) associated with the IMSI. For instance, the Mobile Node may generate a MN-AAA key (key shared between the Mobile Node and a AAA server) and/or MN-HA key (key shared between the Mobile Node and Home Agent). More particularly, the Mobile Node may generate a MN-AAA key, which can then be used to generate a MN-HA key.

In accordance with another aspect of the invention, methods and apparatus for registering a Mobile Node supporting Mobile IP with a Home Agent supporting Mobile IP are disclosed. The Mobile Node sends a bootstrap request to the Home Agent to initiate generation of at least one Mobile IP key from the authentication information associated with the IMSI. The Mobile Node receives a bootstrap reply including a random number from the Home Agent. The Mobile Node then generates the Mobile IP key from the authentication information associated with the IMSI and the random number received in the bootstrap reply.

In accordance with yet another aspect of the invention, a Home Agent receives a bootstrap request from the Mobile Node, the bootstrap request initiating generation of at least one Mobile IP key from the authentication information associated with the IMSI. The Home Agent transmits a bootstrap reply including a random number to the Mobile Node, thereby enabling the Mobile Node to generate the at least one Mobile IP key from the authentication information associated with the IMSI and the random number. In addition, the Home Agent obtains the Mobile IP key, where the Mobile IP key has been derived from the authentication information associated with the IMSI and the random number.

In accordance with yet another aspect of the invention, a server such as a AAA server generates at least one Mobile IP key. Specifically, the AAA server receives a request message from a Home Agent, the request message including an IMSI. The AAA server transmits a second request message including the IMSI to a Home Location Register and receives a reply message from the Home Location Register, where the reply message includes a random number and information derived from both the authentication information associated with the IMSI and the random number. The AAA server may then generate the Mobile IP key from the information derived from both the authentication information associated with the IMSI and the random number.

In accordance with another aspect of the invention, the invention pertains to a system operable to perform and/or initiate any of the disclosed methods in a Home Agent, AAA server, or Mobile Node. The system includes one or more processors and one or more memories. At least one of the memories and processors are adapted to provide at least some of the above described method operations. In yet a further embodiment, the invention pertains to a computer program product for performing the disclosed methods. The computer program product has at least one computer readable medium and computer program instructions stored within at least one of the computer readable product configured to perform at least some of the above described method operations.

These and other features and advantages of the present invention will be presented in more detail in the following specification of the invention and the accompanying figures, which illustrate by way of example the principles of the invention.

DETAILED DESCRIPTION OF SPECIFIC EMBODIMENTS

Reference will now be made in detail to a specific embodiment of the invention. An example of this embodiment is illustrated in the accompanying drawings. While the invention will be described in conjunction with this specific embodiment, it will be understood that it is not intended to limit the invention to one embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

In accordance with various embodiments of the invention, a set of Mobile IP keys is dynamically generated using an existing Home Location Register (HLR)/AuC authentication infrastructure. This is accomplished, in part, by obtaining an International Mobile Subscriber Identity (IMSI) that uniquely identifies a particular Mobile Node (e.g., subscriber. Once a set of Mobile IP keys is generated from the IMSI, the Mobile Node may register with its Home Agent using the set of Mobile IP keys.

Figure 3:
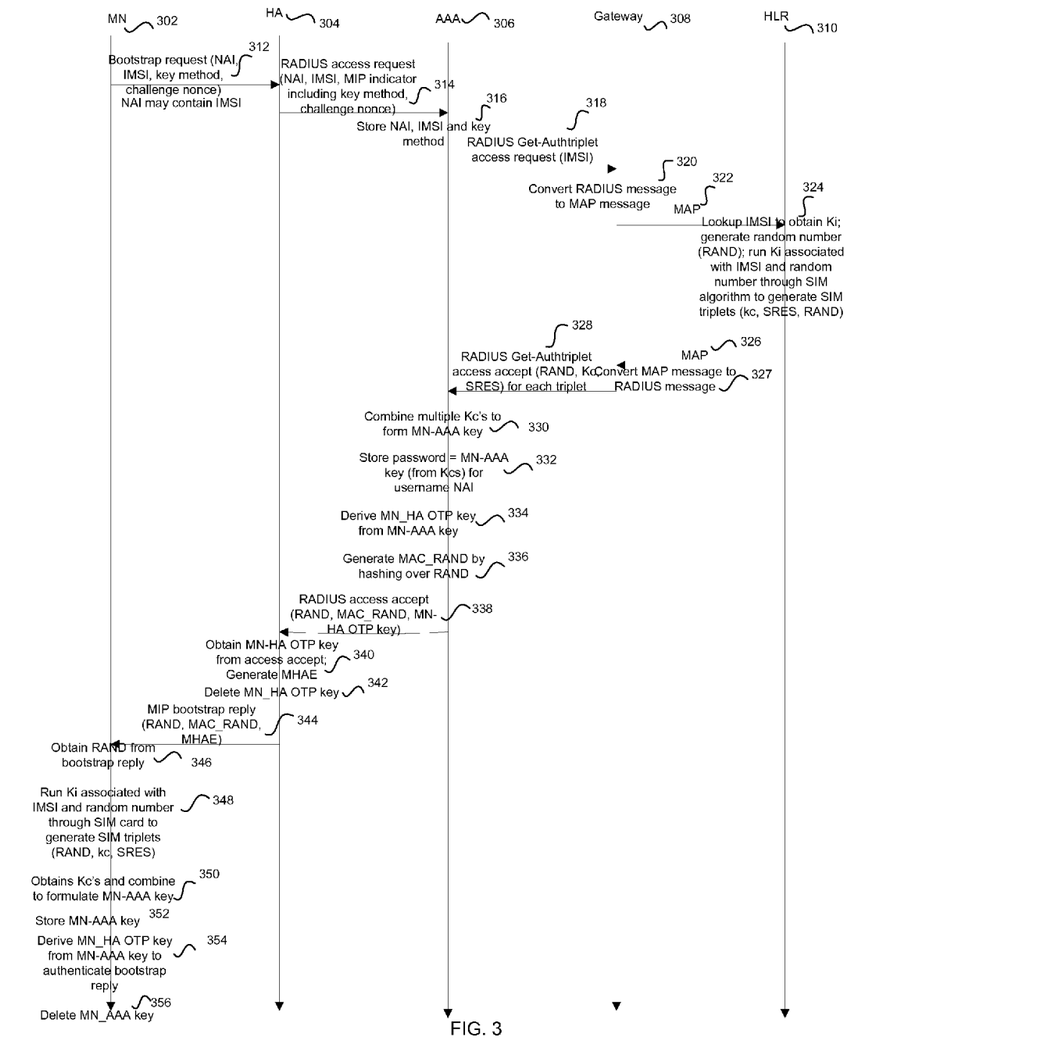
FIG. 3 is a transaction flow diagram illustrating a method of generating a set of Mobile IP keys using an existing HLR/AuC authentication infrastructure in accordance with one embodiment of the invention.

FIG. 3 is a transaction flow diagram illustrating a method of generating a set of Mobile IP keys using an existing HLR/AuC authentication infrastructure in accordance with one embodiment of the invention. Steps performed by a Mobile Node, Home Agent, AAA server, gateway, and HLR are represented by vertical lines 302, 304, 306, 308, and 310, respectively. In order to initiate the generation of the set of Mobile IP keys, the Mobile Node sends a bootstrap request to its Home Agent at 312. The bootstrap request may include the IMSI identifying the Mobile Node. In addition, the bootstrap request may also include an identifier identifying the user such as a Network Access Identifier (NAI) as set forth in RFC 2486, "The Network Access Identifier," by Aboba et al, published January 1999, which is incorporated herein by reference for all purposes. The NAI may contain the IMSI, but preferably does not include the IMSI so as to ensure that the IMSI is not exposed. If the IMSI is not provided in the NAI then the NAI may be a pseudonym that allows for mapping to the IMSI on the AAA server, gateway or HLR. The bootstrap request may further identify the underlying credentials and keying protocol to use to exchange the keying information used to generate the Mobile IP key(s), such as Subscriber Identity Module (SIM) using GSM authentication triplets or Universal Mobile Telecommunications System (UMTS) Subscriber Identity Module (USIM) using the Authentication and Key Agreement (AKA) protocol. If the Mobile Node wishes to authenticate the network it may also include a challenge nonce in the bootstrap request.

When the Home Agent receives the bootstrap request from the Mobile Node, it initiates the generation of the Mobile IP key(s). In order to obtain the Mobile IP key(s), the Home Agent sends a request message including the NAI and/or IMSI to a AAA server at 314. The request message may also indicate the keying method. Specifically, in accordance with one embodiment, the request message includes an attribute-value pair that serves as a Mobile IP indicator to notify the AAA server to generate a set of Mobile IP keys (e.g., MN-AAA key shared between the Mobile Node and the AAA server). This Mobile IP indicator may further include or indicate the keying method, as well as the challenge nonce if presented by the client. The request message is transmitted to the AAA server in the form of a AAA formatted message. For instance, the request message may be sent in the form of a RADIUS access request message. Alternatively, other formats such as TACACS+ or Diameter as set forth in RFC 3588, entitled, "Diameter Base Protocol," Calhoun et al, published September 2003, which is incorporated herein by reference for all purposes, may be implemented.

When the AAA server receives the request message including the IMSI from the Home Agent, it may store information from the request message, as appropriate. Specifically, in order to map the Mobile Node to the IMSI, the AAA server may store the NAI, IMSI, keying method, and/or challenge nonce at 316. In addition, the AAA server transmits a second request message including the IMSI to a Home Location Register at 318. This second request message may merely include the request message received from the Home Agent, or may include an alternate message (e.g., AAA formatted message). For instance, this second request message may be a RADIUS Get-Authtriplet access request including the IMSI. Exemplary messages that may be used are set forth in U.S. patent application Ser. No. 10/266,819, entitled "System and Method for Network User Authentication," by Taylor et al, filed on Oct. 7, 2002, which is incorporated herein by reference for all purposes.

When the gateway receives this second request message, it converts the AAA formatted message to a MAP formatted message at 320. The gateway then sends this MAP formatted message to the HLR at 322. The HLR looks up the IMSI to obtain the secret key (Ki) associated with the IMSI. The HLR generates a random number (RAND), and runs the Ki and random number through an algorithm associated with the IMSI to generate authentication information that may be used to generate the set of Mobile IP keys as shown at 324. For instance, the information may include a set of SIM authentication triplets in accordance with Internet-Draft, "Extensible Authentication Protocol Method for GSM Subscriber Identity Modules (EAP-SIM)," available at http://www.ietf.org/internet-drafts/draft-haverinen-pppext-eap-sim-16.txt, published on Dec. 21, 2004, which is incorporated herein by reference for all purposes. In addition, GSM specification: [GSM 03.20] European Telecommunications Standards Institute, "GSM Technical Specification GSM 03.20 (ETS 300 534): "Digital cellular telecommunication system (Phase 2); Security related network functions," published August 1997, is also incorporated herein for all purposes. Specifically, each SIM triplet typically includes a random challenge (RAND) (e.g., random number) and a response (SRES), and a secret encryption key (Kc). Typically, this set of SIM triplets includes several triplets. The HLR then sends a MAP formatted reply message including the SIM triplet(s) to the gateway at 326. The gateway converts this MAP formatted reply message to a AAA formatted message such as a RADIUS Get-Authtriplet access accept message as set forth in U.S. patent application Ser. No. 10/266,819 at 327 and sends this converted message to the AAA server at 328. In this manner, the AAA server receives one or more random numbers and information derived from both the secret key (Ki) associated with the IMSI and the random number(s).

In order to generate a MN-AAA key shared between the Mobile Node and the AAA server, the AAA server combines two or more of the keys, Kc's, to form the MN-AAA key. Specifically, in accordance with one embodiment, the Kc values for each of the SIM triplets are concatenated to form the MN-AAA key at 330. The AAA server may then store the MN-AAA key at 332. For instance, the AAA server may cache the MN-AAA key as a password for the username (NAI). Thus, the MN-AAA key may be stored in association with the NAI, IMSI and key method. Alternatively the MN-AAA key may also be generated from additional information such as the SRES value and the additional information provided by the mobile node in the bootstrap request such as the NAI, IMSI keying method and/or challenge nonce.

The AAA server may then derive a MN-HA key from the MN-AAA key at 334. The key derivation may involve a one-way function of some or all of the following data: the MN-AAA key, a key label, and additional information provided by the Mobile Node such as the NAI, IMSI keying method and/or challenge nonce. This MN-HA key may be that used by the Mobile Node and Home Agent during the registration process. Alternatively, the MN-HA key may be referred to as a "one time password" (OTP) key. This MN_HA OTP key may be used by the Mobile Node to authenticate the bootstrap process, as will be described in further detail below.

In addition, the AAA server may generate a MAC_RAND to authenticate the network to the Mobile Node at 336 and to provide compatibility with existing EAP-SIM algorithms. The MAC_RAND may be generated using a message authentication code algorithm, keyed hash function, such as HMAC-SHA1. The key for the MAC_RAND may be generated from the authentication triplets and other data using a key derivation function. The data may include information from the authentication triplets, as well as information from the bootstrap request such as the IMSI, NAI, challenge nonce, and keying algorithm. The AAA server sends a reply message including the MN-HA key (e.g., MN_HA OTP key) to the Home Agent at 338. The reply message may also include the random challenges (RAND) from the SIM authentication triplets previously generated by the HLR and used in the key derivations and message authentication codes described above, thereby enabling the Home Agent to provide the random challenges (RAND) to a Mobile Node to enable the Mobile Node to generate the same set of Mobile IP keys (e.g., MN-AAA key, MN-HA key). For instance, the reply message may be a AAA formatted message such as a RADIUS access accept message including the random numbers (RAND), the MN-HA key (e.g., MN-HA OTP key), and the MAC_RAND.

When the Home Agent receives the reply message, it obtains the MN-HA OTP key from the reply message (access accept message) at 340, generates the registration reply and generates a Mobile-Home Authentication Extension (MHAE) from the MN-HA OTP key in accordance with RFC3957, entitled "Authentication, Authorization, and Accounting (AAA) Registration Keys for Mobile IPv4," Perkins et al, March 2005, which is incorporated herein by reference for all purposes. Once the MHAE has been generated, the Home Agent may delete the MN-HA OTP key at 342, where the MN-HA OTP key is used only for bootstrap authentication and therefore serves as a "one time pass." In other words, the MN-HA key may later be re-generated during the registration process once the MN-AAA key has been authenticated.

The Home Agent then sends a bootstrap reply including the random numbers, RAND, to the Mobile Node at 344. The bootstrap reply also includes the MHAE, enabling the Mobile Node to authenticate the bootstrap reply. The bootstrap reply may further include the MAC_RAND to authenticate the network to the Mobile Node and provide compatibility with existing EAP-SIM algorithms.

When the Mobile Node receives the bootstrap reply including one or more random numbers, RAND, it obtains the RAND from the bootstrap reply at 346. The Mobile Node then proceeds to generate the Mobile IP key(s) from the secret key associated with the IMSI, Ki, and the one or more random numbers (RAND) received in the bootstrap reply. Specifically, it performs the same processes performed by the HLR and AAA server to generate the MN-AAA key and MN-HA key, as described above. Specifically, the Mobile Node runs the random number (RAND) through its SIM card containing the key Ki associated with the IMSI to generate a set of SIM triplets (Kc, SRES, RAND) at 348. In other words, the SIM card typically includes both the key Ki and the IMSI. The Mobile Node obtains the keys, Kcs, from the SIM triplets using a one way key derivation function and combines (e.g., concatenates) the keys, Kcs, to form the MN-AAA key at 350. The one-way key derivation function may also use additional information from the GSM triplets such as (SRES) and information from the bootstrap request such as the NAI, keying algorithm or challenge nonce. It may then store the MN-AAA key at 352 to enable the Mobile Node to use the MN-AAA during the registration process. The Mobile Node derives the MN-HA key (e.g., MN-HA OTP key) from the MN-AAA key at 354 to authenticate the bootstrap reply. Authentication is performed according to standard processes as set forth in RFC 3344. The Mobile Node may then delete the MN-AAA key at 356 once the bootstrap reply is authenticated. For instance, it may be desirable to re-generate the MN-AAA key during registration in instances when the bootstrap reply is lost. In these cases, the Mobile Node re-sends the bootstrap request, which results in the generation of a new MN-AAA key.

Figure 4:
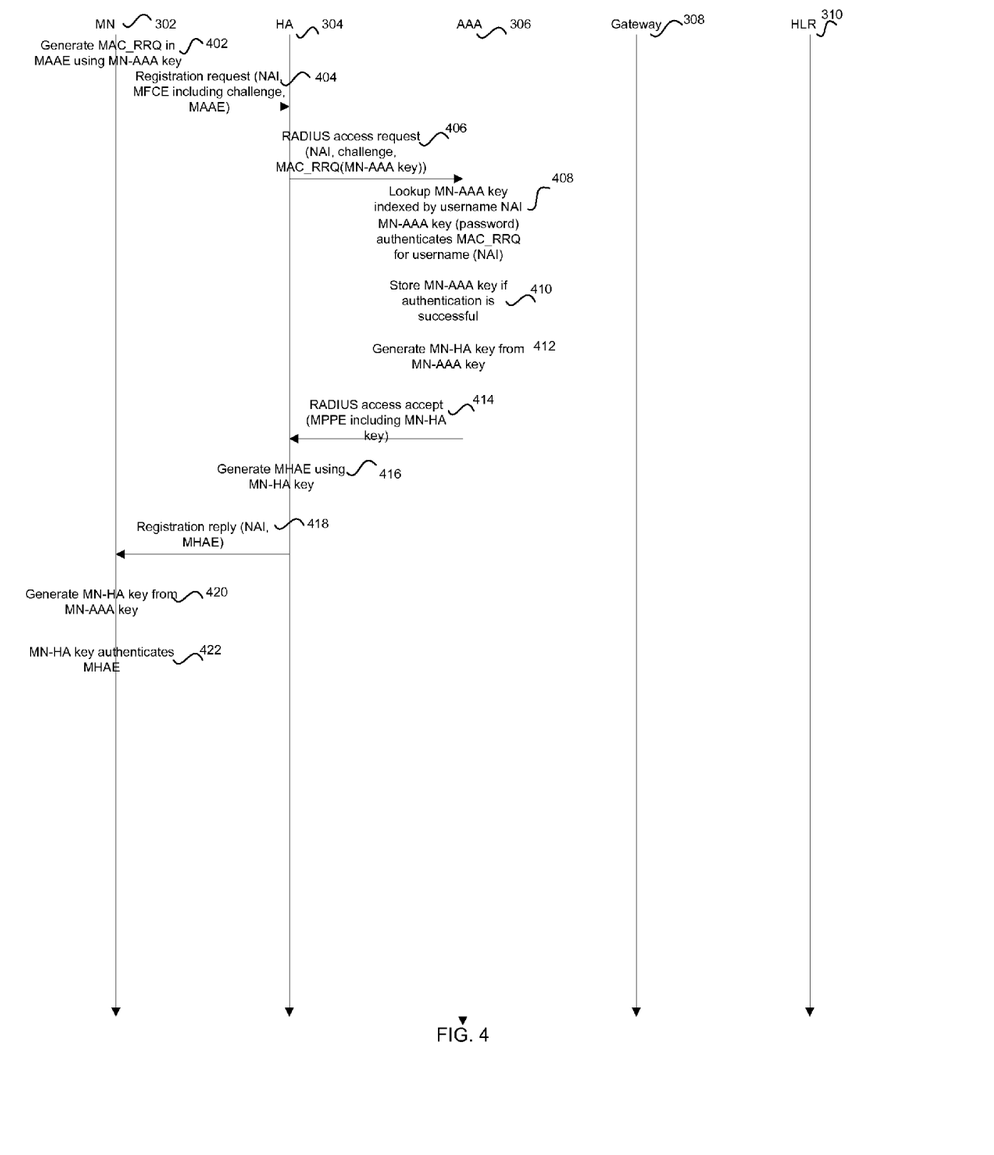
FIG. 4 is a transaction flow diagram illustrating a method of performing Mobile IP registration using the set of Mobile IP keys in accordance with one embodiment of the invention.

FIG. 4 is a transaction flow diagram illustrating a method of performing Mobile IP registration using the set of Mobile IP keys in accordance with one embodiment of the invention. The Mobile Node generates a registration request at 402 using the MN-AAA key and puts the authenticator in a MN-AAA extension of the registration request as set forth in RFC 3012, entitled "Mobile IPv4 Challenge/Response Extensions," by Perkins et al, published November 2000, which is incorporated herein by reference for all purposes. In accordance with one embodiment, the Mobile Node generates a MAC_RRQ using the MN-AAA key and generates the Mobile-AAA Authentication Extension (MAAE) including the MAC_RRQ in accordance with RFC 3012. The Mobile Node appends the MAAE to a registration request including a Network Address Identifier (NAI) in accordance with RFC 2486 and a Mobile-Foreign Challenge Extension (MFCE) including a PPP challenge in accordance with RFC 3012, "Mobile IPv4 Challenge/Response Extensions," Perkins et al, published November 2000, which is incorporated herein by reference for all purposes, and transmits the registration request at 404 to the Home Agent at 404.

When the Home Agent receives the registration request including the MN-AAA$_{[ASP1]}$ authentication extension from the Mobile Node, it authenticates the Mobile Node$_{[ASP2]}$. Specifically, the Home Agent sends a RADIUS access request message including the NAI, the challenge, and the MAC_RRQ including the MN-AAA key or a function of the MN-AAA key to the AAA server. The AAA server then authenticates the request message using the MN-AAA of the request message.

When the AAA server receives the AAA-formatted request message, the AAA authenticates the Mobile Node using the MN-AAA key associated with the Mobile Node. Specifically, the AAA server obtains the NAI from the request message and looks up the MN-AAA key indexed by the NAI at 408, and authenticates the MAC_RRQ using the MN-AAA key. If authentication is successful, the AAA server stores the MN-AAA key at 410. The AAA server generates a MN-HA key from the MN-AAA key at 412 and provides the MN-HA key to the Home Agent at 414. Specifically, the AAA server sends a RADIUS access-accept including the MN-HA key to the Home Agent.

When the Home Agent receives the access accept including the MN-HA key, it generates a Mobile-Home Authentication Extension (MHAE) using the MN-HA key as set forth in RFC 3344 at 416. The Home Agent composes a registration reply including the NAI, appends the MHAE to the registration reply, and sends the registration reply to the Mobile Node at 418.

When the Mobile Node receives the registration reply, it generates a MN-HA key from the MN-AAA key to authenticate the registration reply including the MHAE at 420. The Mobile Node then authenticates the MHAE using the MN-HA key at 422. In this manner, the Mobile Node authenticates the registration reply sent by the Home Agent. Accordingly, the Mobile Node registers with its Home Agent using a key that has been dynamically generated from an existing HLR/AuC authentication infrastructure.

Once the Mobile Node has been successfully registered with the Home Agent, the Mobile Node may authenticate messages received by the Mobile Node to ensure that they have originated from a valid network. For instance, the Mobile Node may obtain a nonce from a mobile nonce generated by the Mobile Node. The Mobile Node may then generate a message authentication code from the nonce, thereby enabling the Mobile Node to authenticate a message as originating from a valid network using the message authentication code.

The invention can also be embodied as computer readable code on a computer readable medium. The computer readable medium is any data storage device that can store data which can thereafter be read by a computer system. Examples of the computer readable medium include read-only memory, random-access memory, CD-ROMs, magnetic tape, and optical data storage devices.

The apparatus (e.g. Mobile Node, Home Agent, AAA server) of this invention may be specially constructed for the required purposes, or may be a general-purpose programmable machine selectively activated or reconfigured by a computer program stored in memory. The processes presented herein are not inherently related to any particular router or other apparatus. In a preferred embodiment, any of the Home Agents of this invention may be specially configured routers such as specially configured router models 1700, 1800, 2500, 2600, 3200, 3600, 4000, 4500, 4700, 7200, and 7500 available from Cisco Systems, Inc. of San Jose, Calif. A general structure for some of these machines will appear from the description given below.

Generally, the registration and key generation techniques of the present invention may be implemented on software and/or hardware. For example, it can be implemented in an operating system kernel, in a separate user process, in a library package bound into network applications, on a specially constructed machine, or on a network interface card. In a specific embodiment of this invention, the technique of the present invention is implemented in software such as an operating system or in an application running on an operating system.

A software or software/hardware hybrid route optimization system of this invention is preferably implemented on a general-purpose programmable machine selectively activated or reconfigured by a computer program stored in memory. Such programmable machine may be a network device designed to handle network traffic. Such network devices typically have multiple network interfaces including frame relay, ISDN, and wireless interfaces, for example. Specific examples of such network devices include routers and switches. For example, the roaming systems of this invention may be specially configured routers such as specially configured router models 350, 1100, 1200, 1400, 1600, 2500, 2600, 3200, 3600, 4500, 4700, 7200, 7500, and 12000 available from Cisco Systems, Inc. of San Jose, Calif. A general architecture for some of these machines will appear from the description given below. In an alternative embodiment, the registration system may be implemented on a general-purpose network host machine such as a personal computer or workstation. Further, the invention may be at least partially implemented on a card (e.g., an interface card) for a network device or a general-purpose computing device.

Figure 5:
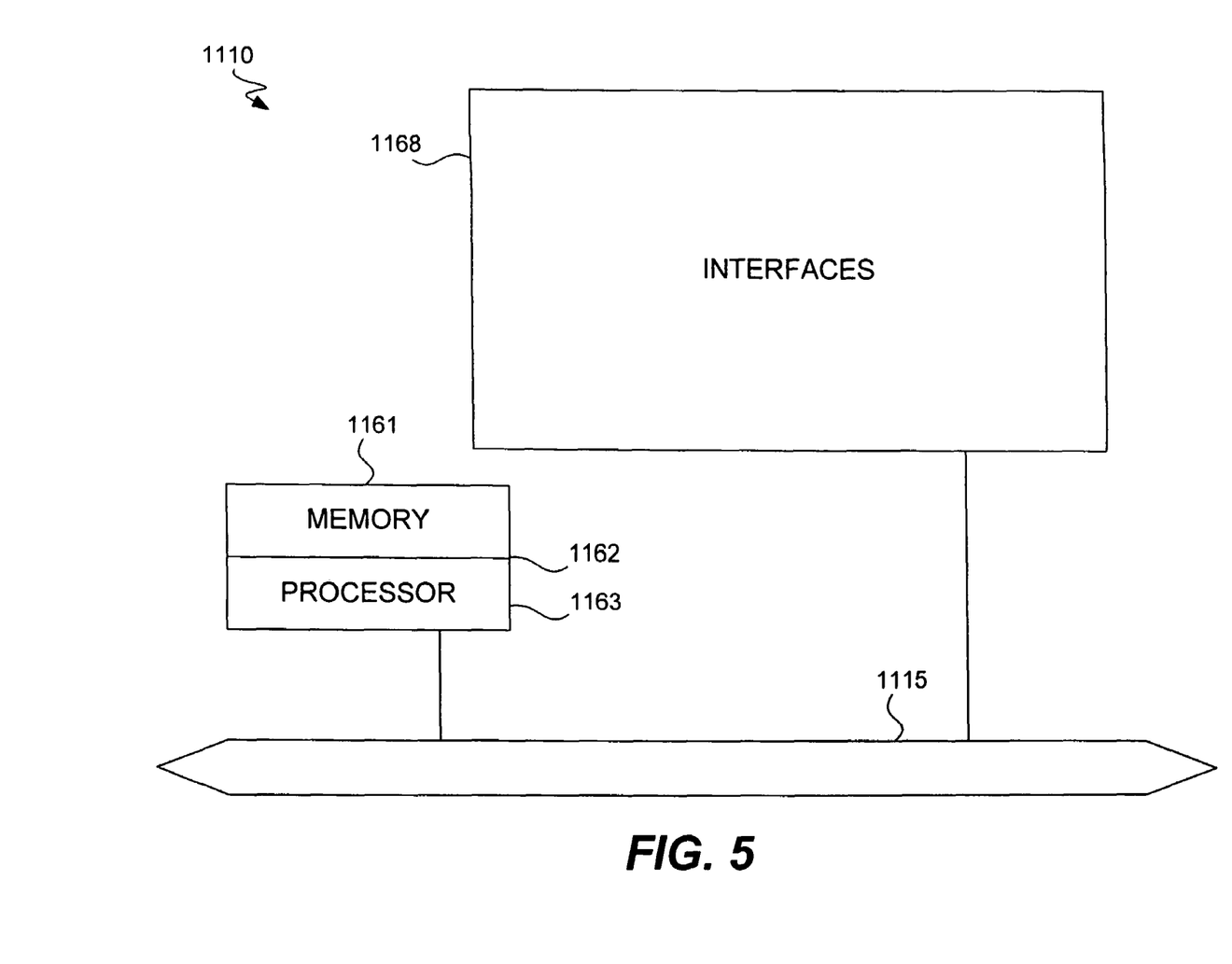
FIG. 5 is a diagrammatic representation of a router in which embodiments of the present invention may be implemented.

Referring now to FIG. 5, a router 1110 suitable for implementing the present invention includes a master central processing unit (CPU) 1162, interfaces 1168, and a bus 1115 (e.g., a PCI bus). When acting under the control of appropriate software or firmware, the CPU 1162 is responsible for such router tasks as routing table computations and network management. It may also be responsible for updating mobility binding and visitor tables, etc. It preferably accomplishes all these functions under the control of software including an operating system (e.g., the Internetwork Operating System (IOS®) of Cisco Systems, Inc.) and any appropriate applications software. CPU 1162 may include one or more processors 1163 such as a processor from the Motorola family of microprocessors or the MIPS family of microprocessors. In an alternative embodiment, processor 1163 is specially designed hardware for controlling the operations of router 1110. In a specific embodiment, a memory 1161 (such as non-volatile RAM and/or ROM) also forms part of CPU 1162. However, there are many different ways in which memory could be coupled to the system.

The interfaces 1168 are typically provided as interface cards (sometimes referred to as "line cards"). Generally, they control the sending and receiving of data packets over the network and sometimes support other peripherals used with the router 1110. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 1162 to efficiently perform routing computations, network diagnostics, security functions, etc.

Although the system shown in FIG. 5 is one specific router of the present invention, it is by no means the only router architecture on which the present invention can be implemented. For example, an architecture having a single processor that handles communications as well as routing computations, etc. is often used. Further, other types of interfaces and media could also be used with the router.

Regardless of the network device's configuration, it may employ one or more memories or memory modules (including memory 1161) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a computer-readable medium in which a carrier wave travels over an appropriate medium such as airwaves, optical lines, electric lines, etc. Examples of program instructions include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

What is claimed is:

1. In a Mobile Node supporting Mobile IP, a method of registering with a Home Agent supporting Mobile IP, comprising:
   sending a bootstrap request to the Home Agent to initiate generation of at least one Mobile IP key from the authentication information associated with an International Mobile Subscriber Identity;
   receiving a bootstrap reply including one or more random numbers from the Home Agent;
   generating the at least one Mobile IP key from the authentication information associated with the International Mobile Subscriber Identity and the random numbers received in the bootstrap reply, wherein generating the at least one Mobile IP key from the authentication information associated with the International Mobile Subscriber Identity and the random number received in the bootstrap reply includes generating a MN-AAA key shared between the Mobile Node and a AAA server;
   generating a registration request including the MN-AAA key;
   generating a MN-HA key from the MN-AAA key to authenticate a registration reply including a MHAE; and
   authenticating the MHAE using the MN-HA key.

2. In a Mobile Node supporting Mobile IP, a method of registering with a Home Agent supporting Mobile IP, comprising:
   sending a bootstrap request to the Home Agent to initiate generation of at least one Mobile IP key from the authentication information associated with an International Mobile Subscriber Identity;
   receiving a bootstrap reply including one or more random numbers from the Home Agent;
   generating the at least one Mobile IP key from the authentication information associated with the International Mobile Subscriber Identity and the random numbers received in the bootstrap reply, wherein generating the at least one Mobile IP key from the authentication information associated with the International Mobile Subscriber Identity and the random number received in the bootstrap reply includes generating a MN-AAA key shared between the Mobile Node and a AAA server;
   deriving a MN-HA key from the MN-AAA key to authenticate the bootstrap reply, wherein the bootstrap reply includes a MH-AE; and
   deleting the MN-HA key after the bootstrap reply is authenticated.

3. In a Home Agent supporting Mobile IP, a method of registering a Mobile Node supporting Mobile IP with the Home Agent, comprising:
   receiving a bootstrap request from the Mobile Node, the bootstrap request initiating generation of at least one Mobile IP key from authentication information associated with an International Mobile Subscriber Identity;
   transmitting a bootstrap reply including one or more random numbers to the Mobile Node, thereby enabling the Mobile Node to generate the at least one Mobile IP key from the authentication information associated with the International Mobile Subscriber Identity and the random numbers;
   obtaining the at least one Mobile IP key, the at least one Mobile IP key being derived from the authentication information associated with the International Mobile Subscriber Identity and the random numbers, wherein the at least one Mobile IP key includes a MN-HA key;
   receiving a registration request including a MN-AAA key from the Mobile Node;
   authenticating the Mobile Node using the MN-AAA key;
   obtaining the MN-HA key, wherein the MN-HA key has been derived from the MN-AAA key;
   generating a MHAE using the MN-HA key;
   appending the MHAE to a registration reply; and
   sending the registration reply to the Mobile Node.

4. The method as recited in claim 3, wherein authenticating is performed using a AAA server and wherein obtaining the MN-HA key comprises obtaining the MN-HA key from the AAA server.

5. The method as recited in claim 4, further comprising:
   providing the MN-AAA key to the AAA server, thereby enabling the AAA server to generate the MN-HA key.

6. In a AAA server, a method of generating at least one Mobile IP key, comprising:
   receiving a request message from a Home Agent, the request message including an International Mobile Subscriber Identity;
   transmitting a second request message including the IMSI to a Home Location Register;

receiving a reply message from the Home Location Register, the reply message including one or more random numbers and information derived from both the authentication information associated with the International Mobile Subscriber Identity and the random numbers;

generating the at least one Mobile IP key from the information derived from both the authentication information associated with the International Mobile Subscriber Identity and the random number, wherein the at least one Mobile IP key includes a MN-AAA key and a MN-HA key; and providing the MN-HA key to the Home Agent, thereby enabling the Home Agent to generate a MHAE during Mobile IP registration.

7. The method as recited in claim 6, wherein the MN-HA key is generated from the MN-AAA key.

8. An AAA server adapted for generating at least one Mobile IP key, comprising:

a processor; and a memory, at least one of the processor or the memory being adapted for:

receiving a request message from a Home Agent, the request message including an International Mobile Subscriber Identity;

transmitting a second request message including the IMSI to a Home Location Register;

receiving a reply message from the Home Location Register, the reply message including one or more random numbers and information derived from both the authentication information associated with the International Mobile Subscriber Identity and the random numbers; and generating the at least one Mobile IP key from the information derived from both the authentication information associated with the International Mobile Subscriber Identity and the random number, wherein the at least one Mobile IP key includes a MN-AAA key and a MN-HA key;

and providing the MN-HA key to the Home Agent, thereby enabling the Home Agent to generate a MHAE during Mobile IP registration.

9. The AAA server as recited in claim 8, at least one of the processor or the memory being further adapted for:

providing the MN-HA key to the Home Agent, thereby enabling the Home Agent to generate a MHAE during Mobile IP registration.

10. The AAA server as recited in claim 8, wherein the MN-HA key is generated from the MN-AAA key.

11. The AAA server as recited in claim 10, at least one of the processor or the memory being further adapted for:

providing the MN-HA key to the Home Agent, thereby enabling the Home Agent to generate a MHAE during Mobile IP registration.

12. A Mobile Node supporting Mobile IP and adapted for registering with a Home Agent supporting Mobile IP, comprising:

a processor; and a memory, at least one of the processor or the memory being adapted for:

sending a bootstrap request to the Home Agent to initiate generation of at least one Mobile IP key from the authentication information associated with an International Mobile Subscriber Identity;

receiving a bootstrap reply including one or more random numbers from the Home Agent;

generating the at least one Mobile IP key from the authentication information associated with the International Mobile Subscriber Identity and the random numbers received in the bootstrap reply, wherein generating the at least one Mobile IP key from the authentication information associated with the International Mobile Subscriber Identity and the random number received in the bootstrap reply includes generating a MN-AAA key shared between the Mobile Node and a AAA server;

generating a registration request including the MN-AAA key;

generating a MN-HA key from the MN-AAA key to authenticate a registration reply including a MHAE; and authenticating the MHAE using the MN-HA key.

13. A Mobile Node supporting Mobile IP and adapted for registering with a Home Agent supporting Mobile IP, comprising:

a processor; and a memory, at least one of the processor or the memory being adapted for:

sending a bootstrap request to the Home Agent to initiate generation of at least one Mobile IP key from the authentication information associated with an International Mobile Subscriber Identity;

receiving a bootstrap reply including one or more random numbers from the Home Agent;

generating the at least one Mobile IP key from the authentication information associated with the International Mobile Subscriber Identity and the random numbers received in the bootstrap reply, wherein generating the at least one Mobile IP key from the authentication information associated with the International Mobile Subscriber Identity and the random number received in the bootstrap reply includes generating a MN-AAA key shared between the Mobile Node and a AAA server;

deriving a MN-HA key from the MN-AAA key to authenticate the bootstrap reply, wherein the bootstrap reply includes a MHAE; and deleting the MN-HA key after the bootstrap reply is authenticated.

14. A Home Agent supporting Mobile IP, the Home Agent being adapted for registering a Mobile Node supporting Mobile IP with the Home Agent, comprising:

a processor; and a memory, at least one of the processor or the memory being adapted for:

receiving a bootstrap request from the Mobile Node, the bootstrap request initiating generation of at least one Mobile IP key from authentication information associated with an International Mobile Subscriber Identity;

transmitting a bootstrap reply including one or more random numbers to the Mobile Node, thereby enabling the Mobile Node to generate the at least one Mobile IP key from the authentication information associated with the International Mobile Subscriber Identity and the random numbers;

obtaining the at least one Mobile IP key, the at least one Mobile IP key being derived from the authentication information associated with the International Mobile Subscriber Identity and the random numbers, wherein the at least one Mobile IP key includes a MN-HA key;

receiving a registration request including a MN-AAA key from the Mobile Node;

authenticating the Mobile Node using the MN-AAA key;

obtaining the MN-HA key, wherein the MN-HA key has been derived from the MN-AAA key;

generating a MHAE using the MN-HA key;

appending the MHAE to a registration reply; and sending the registration reply to the Mobile Node.

15. The Home Agent as recited in claim 14, wherein authenticating is performed using a AAA server and wherein obtaining the MN-HA key comprises obtaining the MN-HA key from the AAA server.

16. The Home Agent as recited in claim 15, at least one of the processor or the memory being further adapted for:
providing the MN-AAA key to the AAA server, thereby enabling the AAA server to generate the MN-HA key.

17. An AAA server adapted for generating at least one Mobile IP key, comprising:
means for receiving a request message from a Home Agent, the request message including an International Mobile Subscriber Identity;
means for transmitting a second request message including the IMSI to a Home Location Register;
means for receiving a reply message from the Home Location Register, the reply message including one or more random numbers and information derived from both the authentication information associated with the International Mobile Subscriber Identity and the random numbers;
means for generating the at least one Mobile IP key from the information derived from both the authentication information associated with the International Mobile Subscriber Identity and the random number, wherein the at least one Mobile IP key includes a MN-AAA key and a MN-HA key; and
means for providing the MN-HA key to the Home Agent, thereby enabling the Home Agent to generate a MHAE during Mobile IP registration.

* * * * *

UNITED STATES PATENT AND TRADEMARK OFFICE
CERTIFICATE OF CORRECTION

PATENT NO. : 7,626,963 B2 Page 1 of 1
APPLICATION NO. : 11/258720
DATED : December 1, 2009
INVENTOR(S) : Patel et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 375 days.

Signed and Sealed this

Twenty-first Day of December, 2010

David J. Kappos
*Director of the United States Patent and Trademark Office*